Patented May 16, 1950

2,508,295

UNITED STATES PATENT OFFICE 2,508,295

PHOTOGRAPHIC FILTER LAYER FOR ABSORBING ULTRAVIOLET RADIATIONS

Verne Reckmeyer, Binghamton, N. Y., assignor to General Aniline & Film Corporation, New York, N. Y., a corporation of Delaware No Drawing. Application November 8, 1945, Serial No. 627,525

4 Claims. (Cl. 88—109)

This invention relates to light filters and particularly to light filters which absorb ultra-violet rays.

The color film which is exploited to the greatest extent at the present time involves a film base and a plurality of superimposed light-sensitive silver-halide emulsions each of which is sensitized respectively to the blue, green and red region of the spectrum. Such film may be in the form of a monopack or a bipack. The emulsions of the film may contain color formers capable of reacting with the oxidation products of a primary aromatic amino developing agent to produce the desired subtractive colors, to wit, yellow, magenta and cyan in situ with the silver image. Conversely, the color formers may be located in the developer, in which case the film must be developed a plurality of times in order to yield the desired color images.

When such a color film is exposed to distant objects or from high altitudes the intervening haze which obscures these objects is due largely to the scattering effect of particles of water vapor in the atmosphere. The scattering effect of these particles of water vapor, which is at a maximum in the ultra-violet region, decreases progressively with longer wave lengths. Hence, the use of ultra-violet and violet light absorbing filters results in an improvement in the definition of distant objects.

Heretofore, a number of light filters which absorb ultra-violet radiations have been employed in photography. These filters depend upon the use of a dye such as, for example, flavazine, tartrazin, aesculine, etc., dissolved or dispersed in a carrying medium, such as, gelatin, cellulose acetate, methyl methacrylate, etc., to secure the light filtering action. These filters have, however, the disadvantage that some of the objects photographed may acquire an excessive yellowish cast, which is highly undesirable especially in color photography.

It is, therefore, an object of the present invention to provide filters for color photography which absorb strong ultra-violet haze, i. e., scattered short wave lengths, and at the same time prevent the photographic color transparency or color negative from acquiring a strong yellow cast.

Another object is to provide a filter for color photography which records objects as neutral, and eliminates the blue color of distance haze.

A still further object is to provide a filter for color photography which will balance the color rendition of both near and far objects.

Other objects and advantages of this invention will become apparent by reference to the following specification in which its preferred details and embodiments are described.

These objects are accomplished by incorporating, into gelatin or other transparent material, a sharp-cutting ultra-violet absorbing dye together with magenta (minus green) and cyan (minus blue) dyes.

In practicing the present invention, any commercially available, sharp-cutting ultra-violet absorbing dye may be employed such as, for example, aldazines, e. g., cinnamalazine, 1.1'-naphthalazine, 2.2'-dihydroxybenzalazine, and the like, as described by Blont and Gofstein in the Jour. Amer. Chem. Soc., 67 p. 13–17, 1945; aromatic hydrocarbons having at least two fused rings of the class of chrysene, anthracene, pyrene, fluorene and naphthalene compounds with carbamide groups, for example, the urea from 2 mols p-aminobenzoyl-p-phenylene diamine sulfonic acid, and the like, as disclosed in United States Patent 2,205,870; and sulfonated bis-[(amino-benzamido-)benzamido]stilbene such as, for example, p.p'-bis-[p-(p'-amino-benzamido-) benzamido-] stilbene-o-o'-di-sodium sulfonate, the sodium salt of m.m' - di - amino - di - benzoyl - m.m' - di - amino - di - benzoyl - p.p' - di - amino - stilbene di - sulfo acid, the sodium salt of m.m' - di - amino - di - benzoyl - p.p' - di - amino - di - benzoyl - p.p' - amino - stilbene - di - sulfo acid, and the like, as disclosed in United States Patent 2,364,112. Similar derivatives of 4.4'-di-amino stilbene, having shorter chains are also suitable. The nature of the dyes is immaterial so long as they possess suitable ultra-violet absorbing characteristics. All of these compounds and many other compounds, which are available to the art, are characterized by having a sharp transition in the region of 375 to 450 m$\mu$. The quantity of any one of these compounds required to effect a satisfactory ultra-violet absorption should be sufficient to give an average transmission of 5% or less from 350–400 m$\mu$, and an average transmission of 85% or more from 450–700 m$\mu$. The amount of dye employed will depend upon the area of the carrying medium of the usual thickness generally prescribed for filters. In general, however, an amount ranging from 0.0001 to 0.01 gram per square inch of carrier is sufficient to give strong ultra-violet absorption. The actual amount employed is determined by colorimetric methods, which are well-known to the art and need not be discussed herein, or by actually preparing the filter and testing it.

The solubility of the ultra-violet absorbing dye is also immaterial, so long as it is miscible with, or is soluble in a solvent and which solution is compatible with, gelatin or other transparent carrying medium, i. e., water soluble for use in gelatin or other water soluble carriers, acetone soluble for use in acetyl cellulose carrier, alcohol soluble for use in alkali soluble resins, and the like.

The magenta and cyan dyes which may be employed with the ultra-violet absorbing dye are those which have an absorption band within the region of 500 to 600 mμ, and 600 to 700 mμ, respectively, and are substantially fully transmitting in the other parts of the spectrum.

As suitable examples of magenta dyes may be mentioned Bordeaux S (Schultz No. 168), Rose Bengal (Schultz No. 595), Brilliant Crocein B (Schultz No. 227), and the like.

As suitable examples of cyan dyes may be mentioned Patent Blue A (Schultz No. 714), Anthraquinone Blue SE (Schultz No. 861), Brilliant Alizarine Viridine F (Schultz No. 354) sulfonated copper phthalocyanine, and the like.

In the case of the magenta and cyan dyes, here too, the nature of the dyes is immaterial so long as they have a weak absorption in the green and a weak absorption in the red, respectively. The actual selection of the dyes is also made by well-known colorimetric methods, as in the case of the ultra-violet dyes, and need not be discussed herein. Due to the fact there is very little absorption of the rays in region from 500 to 700 mμ as compared to the absorption in the region of the ultra-violet rays, the amount of the magenta and cyan dyes employed is materially smaller than that of the ultra-violet absorbing dye and generally ranges from 0.00001 gram to 0.001 gram or more per square inch of carrier of the usual filter thickness.

The filter carrying media which can be used in the preparation of the ultra-violet absorbing filters are gelatin, water soluble cellulose derivatives, e. g., hydroxy ethyl cellulose, polyamides or a mixture of gelatin with a polyamide as described in United States Patent 2,289,775; polyvinyl alcohol and jelling compound as described in United States Patent 2,249,537; polyvinyl acetaldehyde acetal resins and partially hydrolyzed acetate resins described in United States Patents 1,939,422 and 2,036,092; organic esters of cellulose, polyesters, polyamides; polymerization products, such as polyvinyl carbazole, polyacrylic acid, polystyrene acrylic acid, polyvinyl chloride-polyacrylic acid, and polyacrylic acid nitrile-polystyrene carboxylic acid described in United States Patent 2,077,789; alkali soluble resins in which the acid groups are in the form of anhydride groups as described in United States Patent 2,161,788, and the like.

For a fuller understanding of the nature of the invention, reference is made to the following examples which are given merely to further illustrate the invention, and they shoul not be regarded as limitative.

*Example I*

A stock solution of a 10% gelatin was prepared from a clear, colorless gelatin. To 112 cc. of this solution 0.0013 gram of Bordeaux S (Schultz No. 168), 0.0013 gram of Patent Blue A (Schultz No. 714), and 0.065 gram of the urea from 2 mols of p-aminobenzoyl - p - phenylene diamine sulfonic acid were added with stirring. The resulting mixture, after stirring for 2 or 3 minutes until the dyes were dissolved, was filtered through cheese cloth. A glass plate having an area of 130 square inches, which had been previously treated with a mixture of methyl silicon chlorides in order to prevent the dyed gelatin after drying from adhering to the glass plate, was carefully leveled and the filtered mixture poured onto it. At the gelatin solution is poured onto this treated glass plate, it is spread evenly over the surface. When the dyed gelatin solution had been poured onto the plate, it was allowed to anneal or level off for a minute or two so as to smooth out any irregularities of thickness by flowing to its natural level state. The entire glass plate was then chilled at a temperature of about 32° F. for 5–10 minutes to set the mixture. When set, the gel-coated plate was dried for several hours at room temperature and the gelatin foil stripped from the glass plate.

The resulting filter was of a neutral color. When used in color photography, it removed the excess bluishness, caused by ultra-violet radiation, without imparting a distinct yellowish tone to the picture.

*Example II*

Example I was repeated with the exception that the dye mixture was substituted by 0.0026 gram of Rose Bengal (Schultz No. 595), 0.0065 gram of Anthraquinone Blue SE (Schultz No. 861), and 0.24 gram of the urea from 2 mols of p-aminozenzoyl-p-phenylene diamine sulfonic acid.

*Example III*

Example I was repeated with the exception that the dye mixture was substituted by 0.0013 gram of Brilliant Crocein B (Schultz No. 227), 0.0026 gram of sulfonated copper phthalocyanine and 0.5 gram of p,p'- bis - [p - p'-(amino - benzamido-) benzamido-] stilbene-o-o'-di-sodium sulfonate.

Instead of employing the combination of dyes disclosed herein as ultra-violet light filtering material in gelatin or other transparent media, the combination of dyes may also be incorporated in the same amounts in a sensitive emulsion layer or may be incorporated in a gelatin layer between two of the light sensitive layers, or may be incorporated in a backing layer coated on the rear side of the film.

While the present invention has been described in considerable detail with reference to certain preferred procedures, materials and uses, it is understood that the invention is not limited thereto, and that numerous variations may be made in the procedures herein described, and that equivalent materials may be substituted.

What I claim is:

1. An ultraviolet light filter comprising a transparent carrier material containing an ultraviolet absorbing dye having a sharp transition in its transmission characteristics in the region of 375 to 450 millimicrons in an amount ranging from 0.0001 to 0.01 gram per square inch of carrier material and a mixture of a magenta dye having an absorption band within the region of 500 to 600 millimicrons and selected from the class consisting of Bordeaux S, Rose Bengal, and Brilliant Crocein B, and a cyan dye having an absorption band within the region of 600 to 700 millimicrons and selected from the class consisting of Patent Blue A, Anthraquinone Blue SE, Brilliant Alizarine Viridine F, and sulfonated copper phthalocyanine, the said mixture being present in amounts ranging from 0.00001 to 0.001 gram per square inch of carrier material as to compensate for the yellowish cast attributed to the ultraviolet absorbing dye.

2. An ultraviolet light filter comprising a transparent carrier material containing 0.0005 gram of urea from two mols of p-aminobenzoyl-p-phenylene diamine sulfonic acid per square inch of carrier material as an ultraviolet absorbing dye, and a mixture consisting of 0.00001 gram of each of Bordeaux S (Schultz No. 168) and Patent Blue A (Schultz No. 714) per square inch of carrier material.

3. An ultraviolet light filter comprising a transparent carrier material containing 0.0018 gram of urea from two mols of p-aminobenzoyl-p-phenylene diamine sulfonic acid per square inch of carrier material as an ultraviolet absorbing dye, and a mixture consisting of 0.00002 of Rose Bengal (Schultz No. 595) and 0.00005 gram of Anthraquinone Blue SE (Schultz No. 861) per square inch of carrier material.

4. An ultraviolet light filter comprising a transparent carrier material containing 0.0036 gram of p,p'-bis-[p-(p'-amino-benzamido-)benzamido-1-stilbene-o-o'-di-sodium sulfonate per square inch of carrier material as an ultraviolet absorbing dye, and a mixture consisting of 0.00001 gram of Brilliant Crocein B (Schultz No. 227) and 0.00002 gram of sulfonated copper phthalocyanine per square inch of carrier material.

VERNE RECKMEYER.

REFERENCES CITED

The following references are of record in the file of this patent:

UNITED STATES PATENTS

| Number | Name | Date |
|---|---|---|
| 1,507,174 | Haste et al. | Sept. 2, 1924 |
| 1,814,344 | Snelling | July 14, 1931 |
| 2,062,179 | Hunter | Nov. 24, 1936 |
| 2,241,239 | Carroll et al. | May 6, 1941 |

FOREIGN PATENTS

| Number | Country | Date |
|---|---|---|
| 493,308 | Great Britain | Oct. 6, 1938 |
| 551,474 | Great Britain | Feb. 24, 1943 |